US009712705B2

(12) United States Patent
Hasebe

(10) Patent No.: US 9,712,705 B2
(45) Date of Patent: Jul. 18, 2017

(54) IMAGE READING APPARATUS AND IMAGE FORMING APPARATUS WITH MEMORY MANAGEMENT FOR Z-FOLDED DOCUMENTS

(71) Applicant: Konica Minolta, Inc., Chiyoda-ku, Tokyo (JP)

(72) Inventor: Takashi Hasebe, Sagamihara (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/177,789

(22) Filed: Jun. 9, 2016

(65) Prior Publication Data

US 2016/0366297 A1 Dec. 15, 2016

(30) Foreign Application Priority Data

Jun. 9, 2015 (JP) ................................ 2015-116211

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ....... *H04N 1/00785* (2013.01); *H04N 1/0057* (2013.01); *H04N 1/00689* (2013.01); *H04N 1/00708* (2013.01); *H04N 1/00795* (2013.01); *H04N 2201/0082* (2013.01)

(58) Field of Classification Search
CPC ............. H04N 1/00785; H04N 1/0057; H04N 1/00689; H04N 1/00708; H04N 1/00795; H04N 2201/0082

USPC ................................ 358/1.1, 1.12, 1.18, 1.14
See application file for complete search history.

(56) References Cited

U.S. PATENT DOCUMENTS

2005/0187088 A1* 8/2005 Tsukuba ................. B65H 45/12
493/384
2008/0228983 A1* 9/2008 Nishihara ........... G06F 9/44505
710/303

FOREIGN PATENT DOCUMENTS

| JP | H05-116795 A | 5/1993 |
|---|---|---|
| JP | 2002-182320 A | 6/2002 |
| JP | 2007-326709 A | 12/2007 |
| JP | 2012-151586 A | 8/2012 |

OTHER PUBLICATIONS

Notification of Reasons for Refusal issued by the Japanese Patent Office in corresponding Japanese Patent Application No. 2015-116211 on May 9, 2017 (9 pages including partial English translation).

* cited by examiner

*Primary Examiner* — Douglas Tran
(74) *Attorney, Agent, or Firm* — Buchanan Ingersoll & Rooney PC

(57) ABSTRACT

An image reading apparatus which includes an image reading section and a document conveyance section, the image reading apparatus including: a document size detector which detects a document size of the document; and a processor configured to detect whether or not a Z-fold exists in the document for which the document size is detected by the document size detector; unfold a Z-folded part of a Z-folded document for which a Z-fold is detected; and assign image data of the image to a page memory on the basis of the document size detected by the document size detector and whether or not a Z-fold is detected.

13 Claims, 7 Drawing Sheets

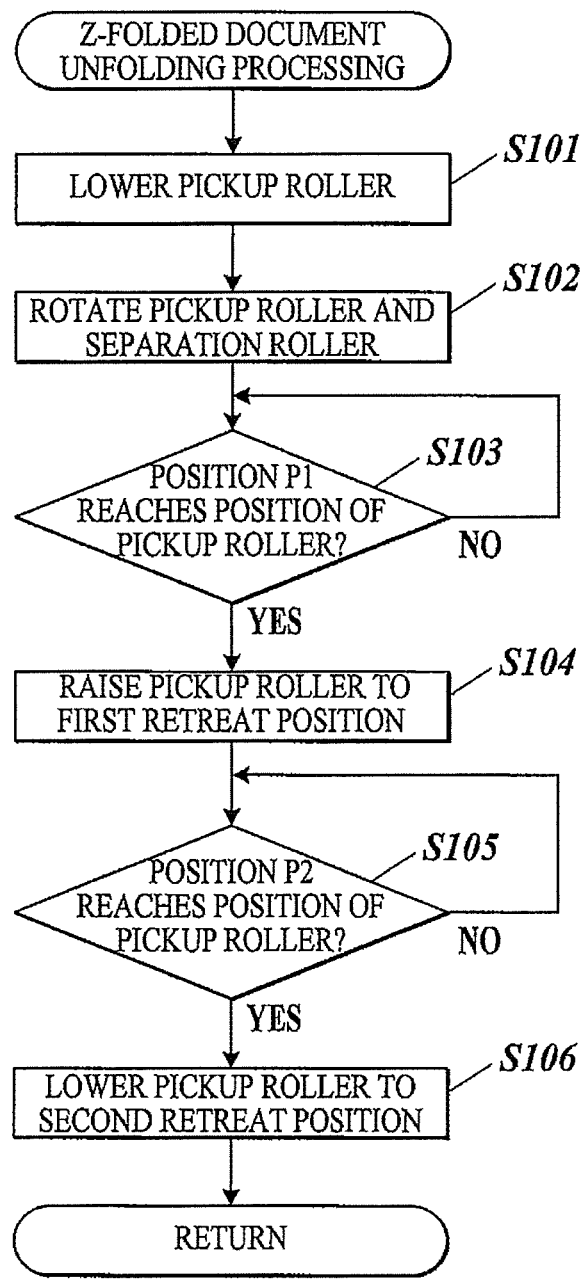

| HEADER INFORMATION | MANAGEMENT SIZE OF PAGE MEMORY |
|---|---|
| P1 | (A4) |
| P2 | (A4) |
| P3+FLAG 1 | (A4_1) |
| P4+FLAG 1 | (A4_2) |
| P5 | (A4) |

IMAGE READING APPARATUS AND IMAGE FORMING APPARATUS WITH MEMORY MANAGEMENT FOR Z-FOLDED DOCUMENTS

BACKGROUND OF THE INVENTION

1. Field of the Invention

The present invention relates to an image reading apparatus and an image forming apparatus.

2. Description of Related Art

Conventionally, there have been known image reading apparatuses which are provided to digital copiers, printers, facsimile machines and such like, the reading apparatuses including auto document feeders (hereinafter, referred to as ADFs) for conveying documents to image reading sections (scanner sections) in the image reading apparatuses.

One of the methods for reading images by the image reading apparatuses which include the above ADFs is a method of fixing an image reading section at a predetermined position below a platen glass which is included in the image reading apparatus and moving the documents one by one at a constant speed above the image reading section to read the images.

By adopting the above reading method, the burden of setting a document on a platen glass is resolved and the time required for replacing documents can be shortened. Thus, processing can be performed to a large amount of documents rapidly, and operability and productivity can be largely improved.

Many users of the image reading apparatuses use binders and document filing folders when filing documents. An appropriate sheet size is determined for each of the binders and document filing folders. When a sheet which is larger than the sheet size by one size is to be filed together with the sheets of the sheet size, the sheet is Z-folded in some cases so as to conform to the sheet size. That is, the document bundle has only the documents of standard size having no folded parts (hereinafter, referred to as non-folded documents) in some cases, and the document bundle includes Z-folded documents and such like which are Z-folded and mixed in the non-folded documents in other cases. The Z-folded document indicates a document which is folded back at the middle position in the long direction so that the front surface overlaps itself, and further folded back at the middle position in the long direction of the folded part so that the back surface overlaps itself. When a document is Z-folded, the size thereof in the long direction is half of the size before the document is folded. Thus, the sheet size of the document is reduced by one size. For example, when an A3 size document is Z-folded, the folded document is A4 size. When a B4 size document is Z-folded, the folded document is B5 size. Accordingly, by Z-folding a document, it is possible to match the sheet size of the document to the non-folded document which is smaller than the document by one size.

In a case where the documents are Z-fold mixed documents which include Z-folded documents (for example, A3 documents) mixed in non-folded documents (for example, A4 documents), when a document size, is detected on the document tray, there is a problem that the document size is detected as A4 document (non-Z-folded documents) though the documents include A3 documents (Z-folded documents).

As a technique for resolving the above problem, there is disclosed a technique of detecting the length of document during conveyance of document and correcting the reading position on the basis of the detected document length (for example, see Japanese Patent Application Laid Open Publication No. 2002-182320). According to the technique described in Japanese Patent Application Laid Open Publication No. 2002-182320, image reading of the Z-fold mixed documents can be performed accurately.

However, as for the memory management of image data of the read images, the management size of image data is set in advance by the document size as a reference which was detected on the document tray before the reading is started. In a case where the image data is data for a Z-folded document, the management size needs to be changed to the size which is larger by one size. Accordingly, system control needs to be changed according to temporary stop of reading operation and change of reading speed, thus lowering productivity according to the reading. Furthermore, though there is a method of detecting the document size for each image reading and performing memory management on the basis of the detected information, time is required for every time detection of document size and setting of management size in this case, thus still lowering productivity according to the reading. The above technique described in Japanese Patent Application Laid Open Publication No. 2002-182320 cannot resolve the above problem according to image data after reading though image reading of Z-fold mixed documents can be performed accurately.

Though there is a method of setting the management size on the basis of the maximum readable document size as a reference (for example, document size of Z-folded document), the method has had a problem that, when image data of non-Z-folded document is stored, wasted space is generated in the page memory and the memory management is not efficient.

SUMMARY OF THE INVENTION

The present invention has been made in consideration of the above matters, and an object of the present invention is to provide an image reading apparatus and an image forming apparatus which can suppress the decrease in productivity of reading while achieving efficient memory management even when image reading is performed to Z-fold mixed documents.

In order to achieve at least one of the above objects, according to one aspect of the present invention, there is provided an image reading apparatus which includes an image reading section that reads an image on a document, and a document conveyance section that conveys a document placed on a document tray to the image reading section, the image reading apparatus including: a document size detector which detects a document size of the document; and a processor configured to detect whether or not a Z-fold exists in the document for which the document size is detected by the document size detector; unfold a Z-folded part of a Z-folded document for which a Z-fold is detected; and assign image data of the image read by the image reading section to a page memory on the basis of the document size detected by the document size detector and whether or not a Z-fold is detected.

Preferably, in the image reading apparatus, the processor sets a management size of image data for the Z-folded document to twice a management size of image data for a non-Z-folded document, and provides flag information indicating that the document is the Z-folded document to header information of the image data for the Z-folded document.

Preferably, in the image reading apparatus, the processor sets the document size detected by the document size detector as a reference size.

Preferably, in the image reading apparatus, the processor sets, as a reference size, a document size of the non-Z-folded document for which a Z-fold is not detected.

Preferably, in the image reading apparatus, the processor performs image correction to the Z-folded document on the basis of the flag information.

Preferably, in the image reading apparatus, the processor performs image correction corresponding to a type of a folding line of the Z-folded document.

According to another aspect of the present invention, there is provided an image forming apparatus including: the above image reading apparatus; and an image forming section which forms an image of a document on a sheet, the image of the document being read by the image reading section.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a flowchart showing Z-folded document unfolding processing;

DETAILED DESCRIPTION OF THE PREFERRED EMBODIMENT

Hereinafter, an embodiment of the present invention will be described in detail with reference to the drawings.

Figure 1:
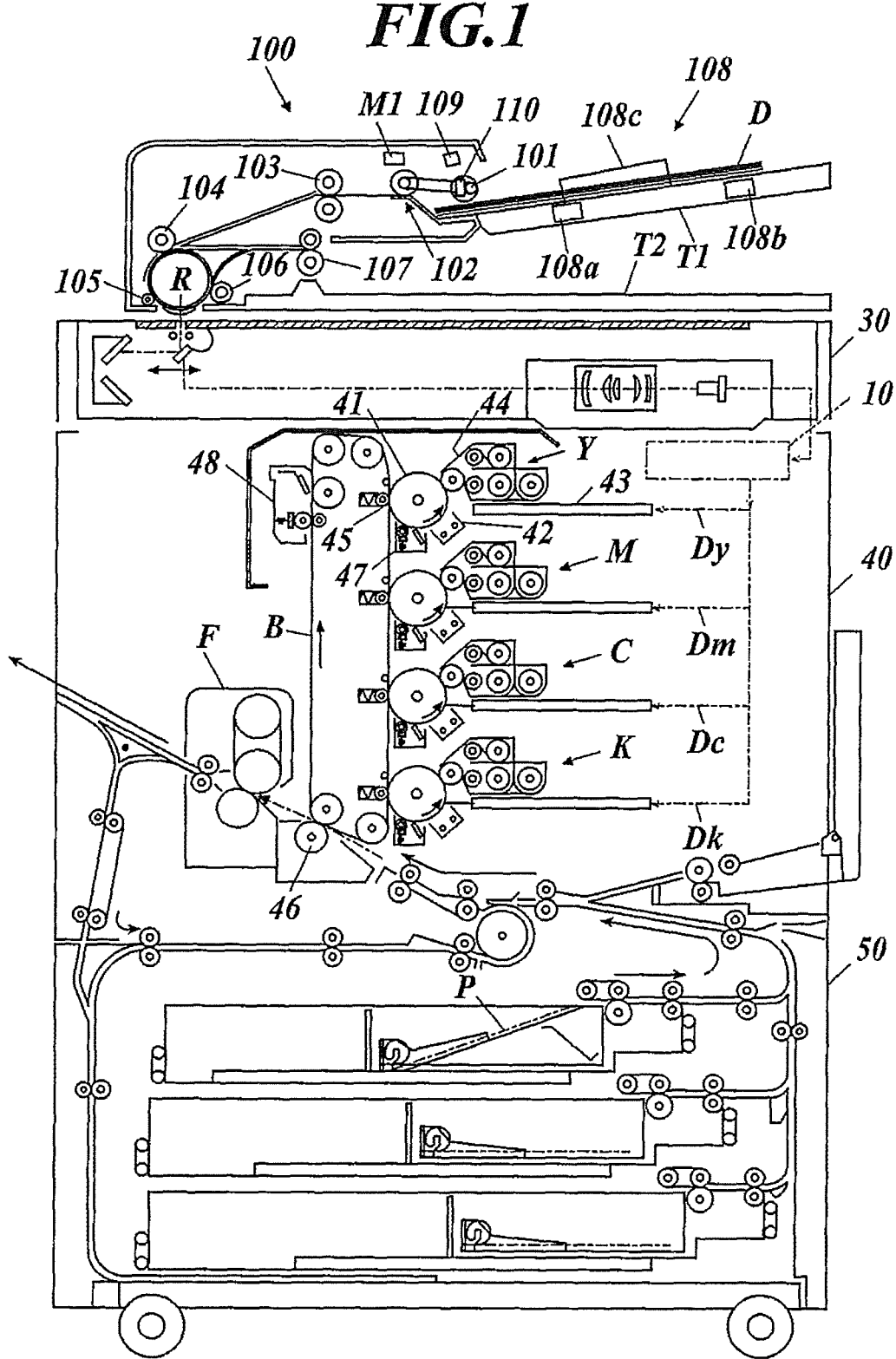
FIG. 1 is a view showing a schematic configuration of an image forming apparatus according to an embodiment.
Figure 2:
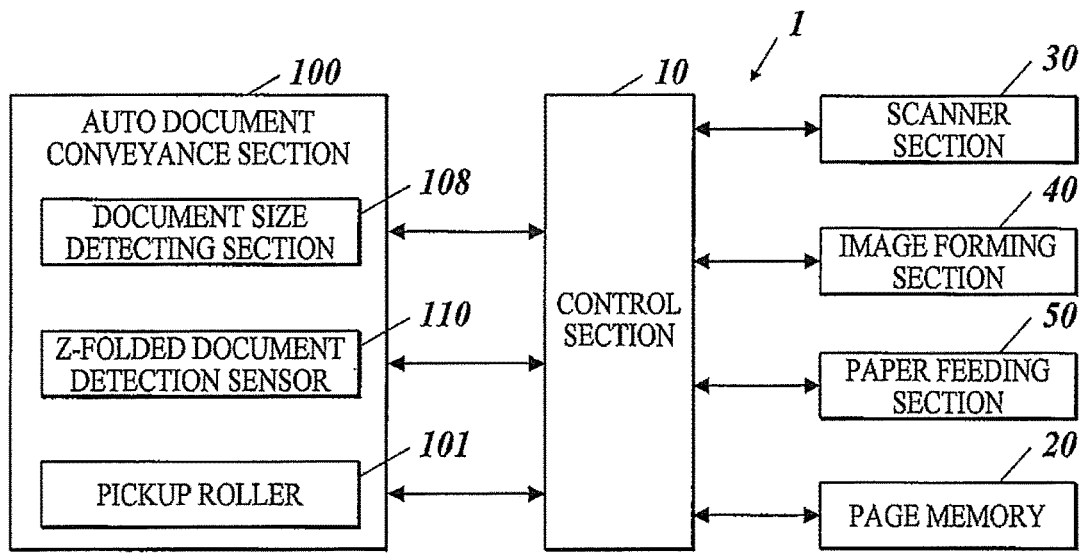
FIG. 2 is a functional block diagram showing a control structure of the image forming apparatus according to the embodiment.

An image forming apparatus 1 according to an embodiment is used as a printer and a digital copier, for example, and configured by including an auto document conveyance section 100, a scanner section 30, an image forming section 40, a paper feeding section 50, a control section 10, a page memory 20 and such like as shown in FIGS. 1 and 2.

The auto document conveyance section (document conveyance section) 100 is an ADF unit which executes image reading by the sheet-through system of reading an image while conveying the document.

The auto document conveyance section 100 is configured by including a pickup roller 101, a separation section 102, a first resist roller 103, a second resist roller 104, a first conveyance roller 105, a second conveyance roller 106 and an ejection roller 107.

The pickup roller 101 is provided above a document tray T1 so as to move up and down to contact and move away from documents D which are accumulated on the document tray T1 with the front surfaces up. The documents D which were sent by the pickup roller 101 are transmitted to the separation section 102 and separated one by one by the separation section 102.

The pickup roller 101 is attached to the rotation end of a pickup arm 101a so as to be rotatable, the pickup arm 101a rotating up and down in accordance with the forward and backward rotations of a pickup lifting motor M1. In accordance with the forward and backward rotations of the pickup lifting motor M1, the pickup roller 101 is rotated up and down integrally with the pickup arm 101a.

The separation section 102 is configured by including a separation roller 102a and a separation pad 102b which contacts the separation roller 102a from below. The separation section 102 separates only the upmost document from among the documents transmitted by the pickup roller 101. The pickup roller 101 and the separation roller 102a are driven by a pickup motor (not shown in the drawings).

The documents D which were separated by the separation section 102 are subjected to skew correction by the first resist roller 103 and thereafter conveyed to a reading position R by the second resist roller 104 and the first conveyance roller 105. Image reading is performed while the documents D pass the reading position R. After the image reading was performed, the documents are ejected in order onto an ejection tray T2 by the second conveyance roller 106 and the ejection roller 107.

The document tray T1 of the auto document conveyance section 100 is provided with a document size detector 108 for detecting the document size of the documents D placed thereon. The document size is, for example, the document size of the entire document bundle, that is, the document size of non-folded documents in a case of Z-fold mixed documents which include Z-folded documents in non-folded documents.

Figure 3:
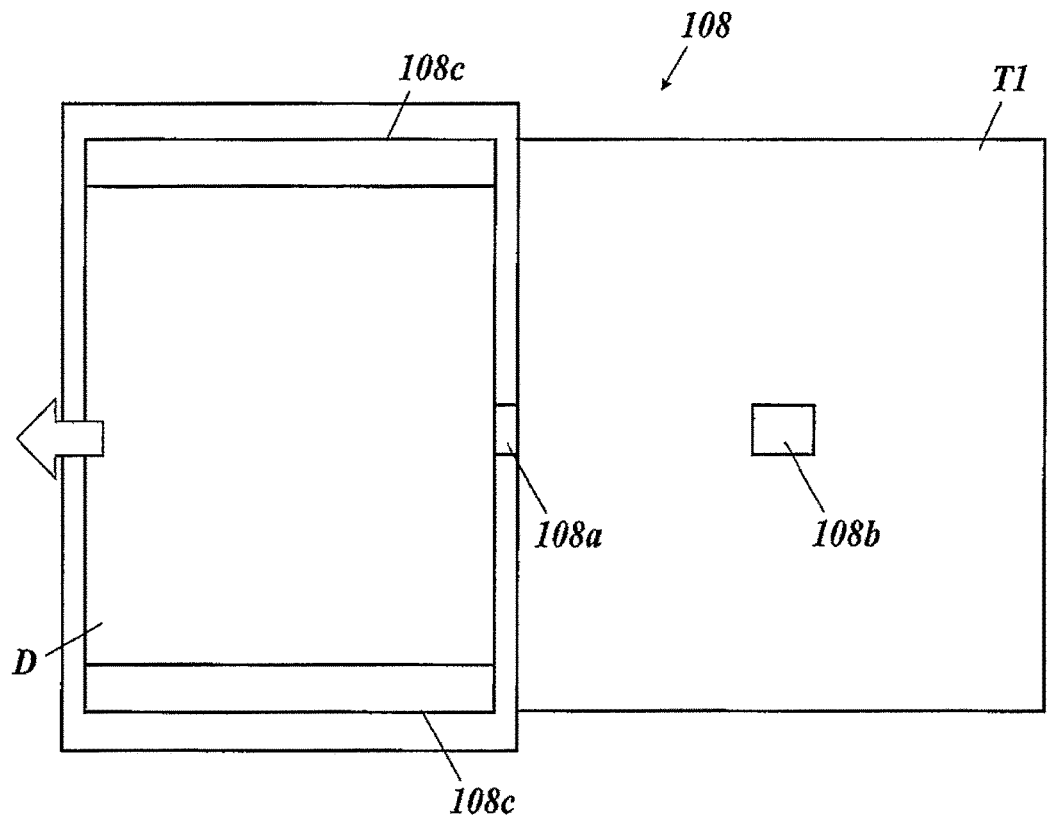
FIG. 3 is a view showing a schematic configuration of a document size detector.

As shown in FIG. 3, the document size detector 108 is configured by including two document detection sensors 108a and 108b which determine the length in conveyance direction of documents D placed on the document tray T1, and a pair of width direction regulating plates 108c which is disposed on the document tray T1 so as to be slidable in the width direction orthogonal to the conveyance direction.

The document detection sensors 108a and 108b are optical sensors which are disposed in series in the conveyance direction, and output detection information indicating the detection of documents D to the control section 10 when the documents D exist thereon. Specifically, in a case where documents D to be conveyed in the short direction are placed on the document tray T1, only the document detection sensor 108a located downstream in the conveyance direction outputs the detection information of documents ID to the control section 10. On the other hand, in a case where documents D to be conveyed in the long direction are placed on the document tray T1, both of the two document detection sensors 108a and 108b output detection information of the documents D to the control section 10.

The pair of width direction regulating plates 108c ensures stability when feeding the documents ID by regulating the width direction of the documents D placed on the document tray T1. The pair of width direction regulating plates 108c is provided with slide gears (not shown in the drawings). When the pair of width direction regulating plates 108c moves, the slide resistance (not shown in the drawings) in conjunction with the slide gears is changed.

Here, the strength of slide resistance corresponds to the size in the width direction of the documents D (main scanning direction size). The value obtained by A/D conversion of the slide resistance is output to the control section 10. The control section 10 acquires the document size, of documents D on the basis of the A/D value and the detection information of the document detection sensors 108a and 108b. In the embodiment, the standard document sizes (sizes of AB series, major document sizes in the US such as letter size and statement half letter size) can be detected.

Figure 5A:
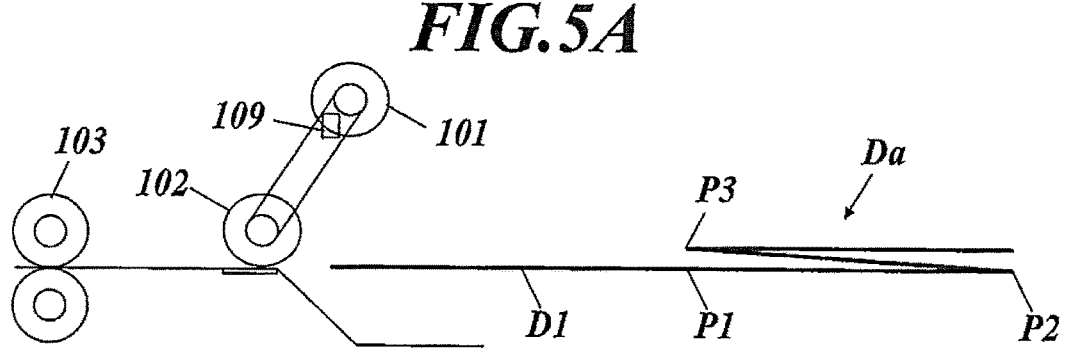
FIG. 5A is a view showing an HP position of a pickup roller.

There is also provided an HP sensor 109 above the document tray T1 of the auto document conveyance section 100, the HP sensor 109 detecting that the pickup roller 101 is located at the HP position (standby position) which is the highest position shown in FIG. 5A by detecting the position of pickup arm 101a. The pickup roller 101 is located at the HP position before the start of separation conveyance operation of Z-folded document (for example, at the time of power activation and before the start of job).

The pickup roller 101 of the auto document conveyance section 100 is loaded with a Z-folded document detection sensor 110 for detecting the portion (Z-folded part) protruding above the upmost document, that is, detecting whether or not the upmost document is a Z-folded document. The Z-folded document detection sensor 110 is a ranging sensor of optical type having integrated light emitting section and light receiving section. The Z-folded document detection sensor 110 can detect the Z-folded part of the Z-folded document which is set on the document tray T1 remaining folded or not being unfolded sufficiently. If the Z-folded part is detected, the Z-folded document detection sensor 110 outputs detection information indicating the detection of Z-folded part to the control section 10.

The control section 10 determines whether or not the document is the Z-folded document on the basis of the detection information of the Z-folded document detection sensor 110. That is, the control section 10 functions as a processor of the present invention, the processor being configured to detect whether or not a Z-fold exists in the document for which the document size is detected by the document size detector. If it is determined that the document is the Z-folded document, the control section 10 performs the processing of unfolding the Z-folded document. That is, the control section 10 functions as a processor of the present invention, the processor being configured to unfold a Z-folded part of a Z-folded document for which a Z-fold is detected.

Here, the Z-folded document unfolding processing in the auto document conveyance section 100 which includes the Z-folded document detection sensor 110 will be described with reference to FIGS. 4 to 6. The processing is started by the trigger of detection by the Z-folded document detection sensor 110 detecting the Z-folded part Da of the upmost document D1 placed on the document tray T1.

For the convenience of explanation, only the upmost document D1 (here, Z-folded document) is described in FIGS. 5A to 6D though the document bundle D shown in FIG. 1 is placed on the document tray T1. In the Z-folded document D1, the position located ¼ of the conveyance direction length from the conveyance direction front end is referred to as P1, the position of the first folded portion (first folded part) of the Z-folded part Da is referred to as P2, and the position of next folded portion (second folded part) is referred to as P3.

Figure 5B:
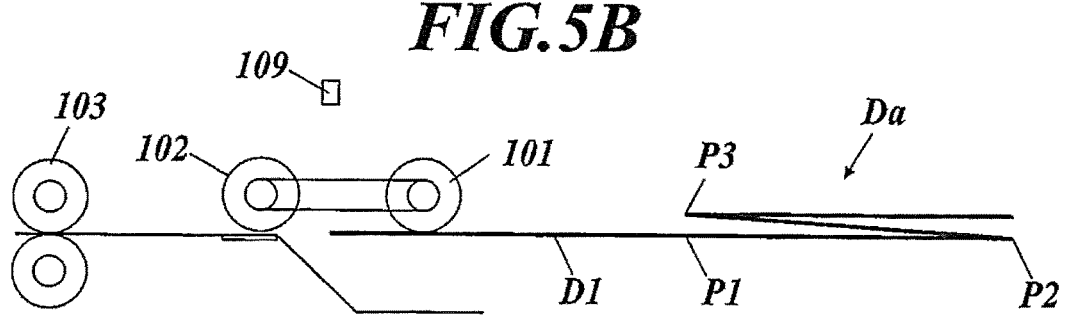
FIG. 5B is a view showing a state in which the pickup roller is lowered from the HP position to land on the upmost document.
Figure 5C:
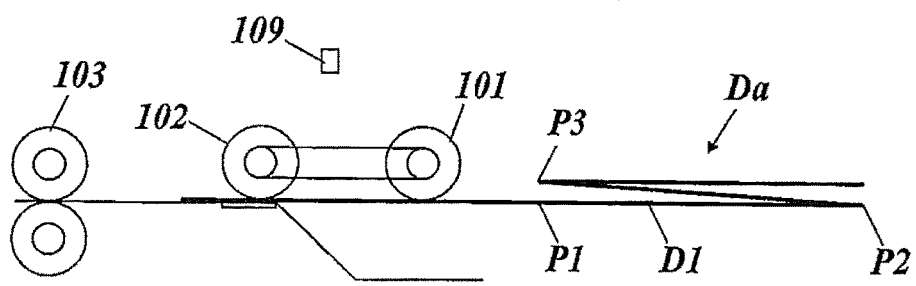
FIG. 5C is a view showing a state in which the upmost document of the document bundle is conveyed to a separation section and only the upmost Z-folded document is separated and conveyed.

First, as shown in FIG. 4, the control section 10 rotates the pickup lifting motor M1 in the forward direction so as to lower the pickup roller 101 from the HP position (see FIG. 5A) together with the pickup arm 101a and to land on the upmost document D1 as shown in FIG. 5B (step S101).

Next, the control section 10 rotates the pickup motor (not shown in the drawings) to rotate the pickup roller 101 and the separation roller 102a (step S102). Thereby, the upmost document D1 of document bundle D is conveyed to the separation section 102, and only the upmost Z-folded document D1 is separated and conveyed by the separation section 102 (see FIG. 5C). The separated Z-folded document D1 is conveyed to the first resist roller 103.

The control section 10 determines whether or not the position P1 located ¼ of the conveyance direction length of document reaches the position of pickup roller 101, that is, whether or not the position P3 of the second folded part of the Z-folded part Da reaches the position of pickup roller 101 (step S103).

Figure 6A:
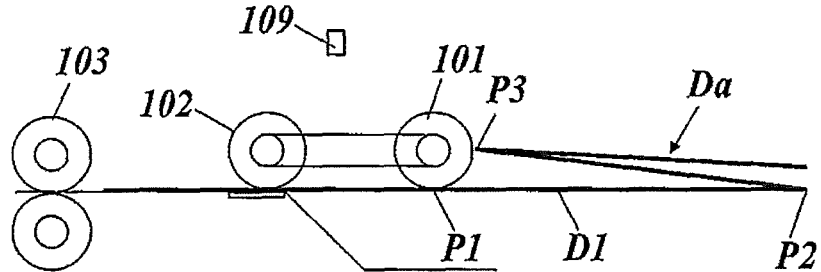
FIG. 6A is a view showing a state in which a position in the document located one fourth of the conveyance direction length from the edge of the document reaches the position of the pickup roller.

If it is determined that the position P1 reaches the position of pickup roller 101 as shown in FIG. 6A (step S103: YES), the control section 10 proceeds to the next step S104.

On the other hand, if it is not determined that the position P1 reaches the position of pickup roller 101 (step S103: NO), the processing is repeated until it is determined that the position P1 reaches the position of pickup roller 101.

Figure 6B:
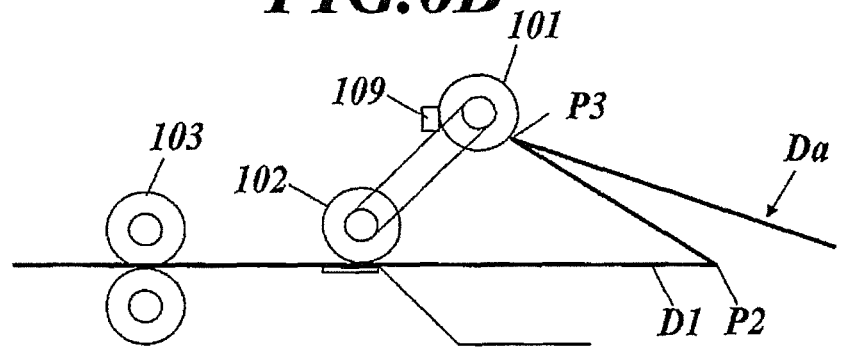
FIG. 6B is a view showing a state in which the pickup roller is raised to a first retreat position.
Figure 6C:
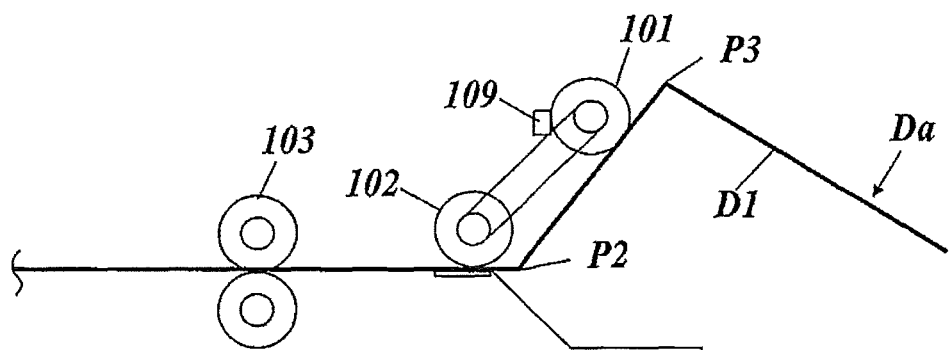
FIG. 6C is a view showing a state in which the Z-folded document is conveyed while being unfolded.
Figure 6D:
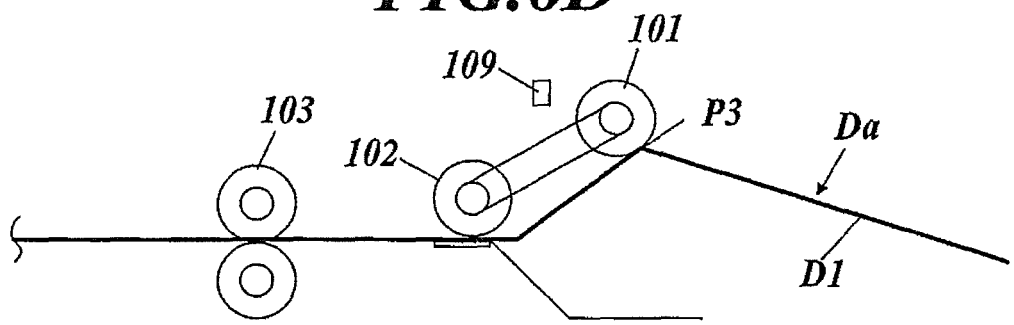
FIG. 6D is a view showing a state in which the pickup roller is lowered from the first retreat position to a second retreat position.

Next, the control section 10 rotates the pickup lifting motor M1 in the backward direction so as to raise the pickup roller 101 to the first retreat position as shown in FIG. 6B (step S104). In accordance with the rise of pickup roller 101, the position P3 of the second folded part is raised. When the position P3 of the second folded part is raised while contacting the pickup roller 101, the Z-folded document D1 is conveyed by the separation roller 102a while the position P3 of second folded part is in contact with the pickup roller 101. As a result, the Z-folded document D1 is conveyed while being unfolded (see FIG. 6C).

The control section 10 determines whether or not the position P2 of first folded part in the Z-folded document D1 reaches the position of pickup roller 101 (step S105).

If it is determined that the position P2 reaches the position of pickup roller 101 (step S105: YES), the control section 10 proceeds to the next step S106.

On the other hand, if it is not determined that the position P2 reaches the position of pickup roller 101 (step S105: NO), the control section 10 repeats the processing until it is determined that the position P2 reaches the position of pickup roller 101.

Next, the control section 10 rotates the pickup lifting motor M1 in the forward direction, and lowers the pickup roller 101 from the first retreat position (see FIG. 6C) to the second retreat position (see FIG. 6D) (step S106). By lowering the pickup roller 101 to the second retreat position in such way, the Z-folded document D1 can be pressed from above. Thus, even in a case where the Z-folded document D1 is set without being unfolded, the Z-folded document D1 can be conveyed with the Z-folded part Da being unfolded.

The scanner section 30 is configured by including an optical system such as a light source and a reflecting mirror. The scanner section 30 emits light source to the document D which was conveyed to the reading position R via a predetermined conveyance path or the document D which was placed on a platen glass, and receives the reflected light. The scanner section 30 converts the received reflected light to an electric signal and outputs the signal to the control section 10. That is, the scanner section 30 functions as an image reading section of the present invention.

The image forming section 40 is configured by including a yellow image forming section Y, a magenta image forming section M, a cyan image forming section C, a black image forming section K, an intermediate transfer belt B, a fixing device F and such like.

The image forming sections Y, M, C and K respectively form toner images of yellow, magenta, cyan and black on respective photoreceptor drums 41, and primary transfer the toner images of yellow, magenta, cyan and black formed on the photoreceptor drums 41 onto the intermediate transfer belt B.

Since the configurations and operations of the image forming sections Y, M, C and K are similar to each other, hereinafter, a series of image forming operation to be performed by the image forming section 40 will be described by taking the yellow image forming section Y as an example.

The yellow image forming section Y is configured by including a photoreceptor drum 41, a charging device 42, an exposure device 43, a developing device 44, a primary transfer roller 45, a secondary transfer roller 46, a cleaning device 47 and such like.

The photoreceptor drum 41 is configured by including an organic semiconductor layer having phthalocyanine pigment dispersed in polycarbonate and a photoreceptor layer formed of a charge transport layer on the surface.

The charging device 42 uniformly charges the photoreceptor drum 41.

The exposure device 43 removes the charge of the exposed portion where image information is exposed on the photoreceptor drum 41 on the basis of image data Dy from the control section 10, and forms an electrostatic latent image on the image region of the photoreceptor drum 41.

The developing device 44 supplies toners onto the electrostatic latent image which was formed on the photoreceptor drum 41 as a developing process, and forms a yellow toner image on the photoreceptor drum 41.

The primary transfer roller 45 primary transfers the yellow toner image formed on the photoreceptor drum 41 onto the intermediate transfer belt B.

The other image forming sections M, C and K also similarly primary transfer the respective toner images of magenta, cyan and black onto the intermediate transfer belt B. Thereby, color toner images of Y, M, C and K are formed on the intermediate transfer belt B.

The secondary transfer roller 46 secondary transfers the toner images of Y, M, C and K transferred on the intermediate transfer belt B onto a sheet P which was conveyed from the paper feeding section 50.

The image forming section 40 heats and pressurizes, by the fixing device F, the sheet P on which the yellow, magenta, cyan and black toner images are secondary transferred, and thereafter the image forming section 40 conveys the sheet P through a predetermined conveyance path and ejects the sheet P outside the apparatus.

The above operations are the series of image forming operation by the image forming section 40.

A cleaning device 47 removes residual materials such as residual toners and paper powders remaining on the surface of photoreceptor drum 41 after the primary transfer was performed. A cleaning device 48 removes residual materials remaining on the intermediate transfer belt B after the secondary transfer was performed.

The cleaning devices 47 and 48 are similar to each other in removing residual materials remaining on the photoreceptor drum 41 or intermediate transfer belt B, and thus, have similar configurations and perform similar operations.

The paper feeding section 50 is configured by including a plurality of trays and contains a plurality of different types of sheets P in the respective trays. The paper feeding section 50 feeds the contained sheets P by a predetermined conveyance path to the image forming section 40.

The control section 10 is configured by including a CPU, a RAM, a ROM and such like. The CPU loads various programs stored in the ROM into the RAM, and integrally controls, in cooperation with the loaded various programs, the operations of the sections in the image forming apparatus 1 such as the auto document conveyance section 100, scanner section 30, image forming section 40, paper feeding section 50 and such like (see FIG. 2). For example, the control section 10 inputs an electrical signal from the scanner section 30 to perform various types of image processing and outputs image data Dy, Dm, Do and Dk of yellow, magenta, cyan and black colors generated by the image processing to the image forming section 40. The control section 10 controls the operation of the image forming section 40 to form an image on the sheet P.

The page memory 20 is a memory for temporarily storing, by the document page, the image data which was output from the scanner section 30. A DRAM (Dynamic RAM) can be used as the page memory 20, for example.

Figure 7:
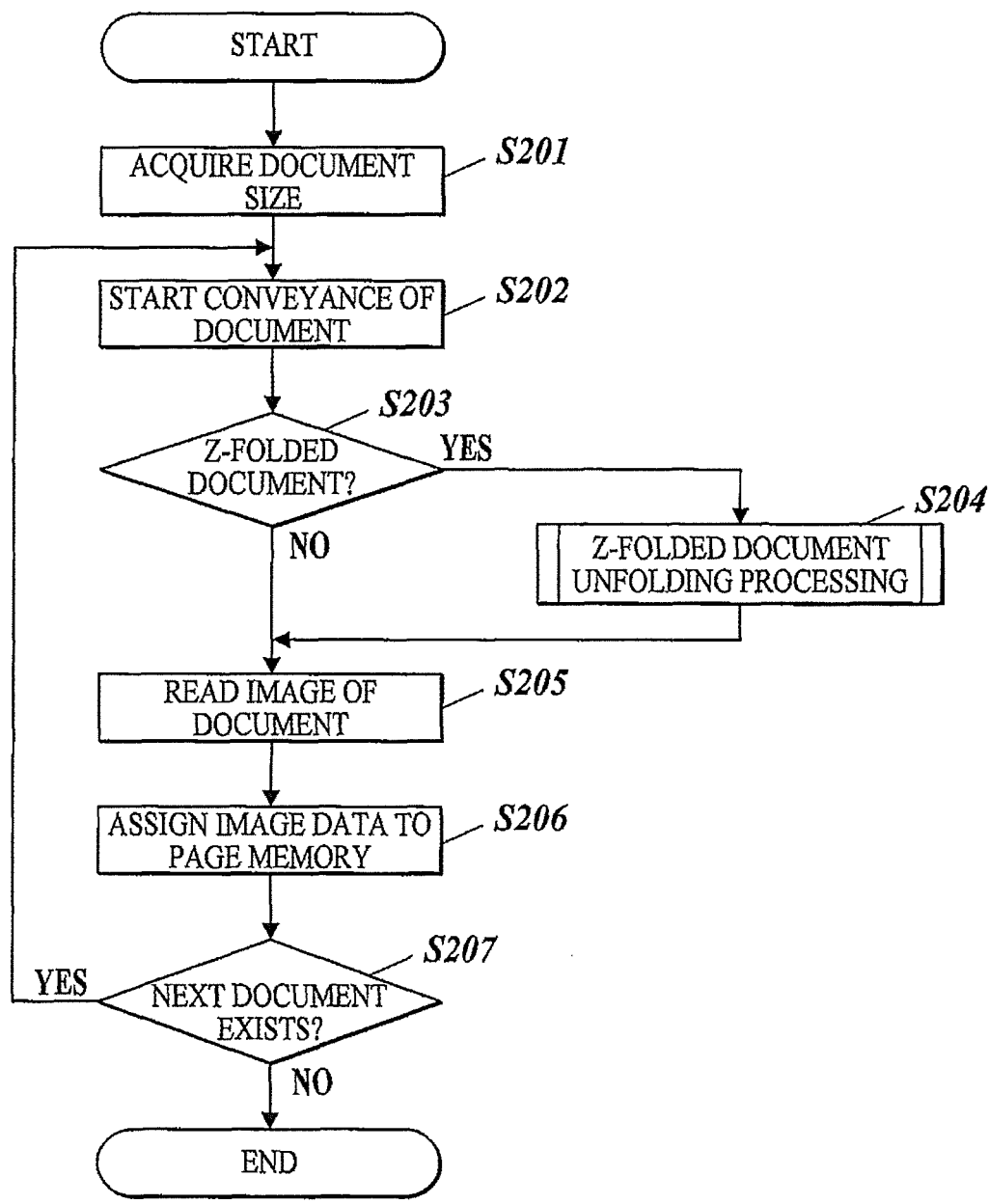
FIG. 7 is a flowchart showing an operation of the image forming apparatus according to the embodiment.

Next, the operation of image forming apparatus 1 according to the embodiment will be described with reference to the flowchart shown in FIG. 7. The operation is started by a trigger that the document bundle D was set on the document tray T1 of the auto document conveyance section 100.

The control section 10 first acquires the document size of the documents placed on the document tray T1 on the basis of the detection information detected by the document size detector 108 (step S201).

The control section 10 starts conveyance of the documents for which the document size was acquired in step S1 (step S202).

The control section 10 determines whether or not the upmost document D1 is a Z-folded document on the basis of the detection information detected by the Z-folded document detection sensor 110 (step S203).

If it is determined that the upmost document D1 is a Z-folded document (step S203: YES), the control section 10 performs Z-folded document unfolding processing to the upmost document D1 (step S204), and thereafter proceeds to step S205.

On the other hand, if it is not determined that the upmost document D1 is a Z-folded document (step S203: NO), the control section 10 determines that the upmost document D1 is a non-Z-folded document, and proceeds to step S205.

Next, the control section 10 controls the scanner section 30 to read the image on the non-Z-folded document or the document having the Z-folded part unfolded (step S205).

The control section 10 assigns image data of the document which was read in step S205 to the page memory 20 on the basis of the document size acquired in step S201 and whether or not the document is Z-folded which was determined in step S203 (step S206). That is, the control section 10 functions as a processor of the present invention, the processor being configured to assign image data of the image read by the image reading section to a page memory on the basis of the document size detected by the document size detector and whether or not a Z-fold is detected. Specifically, the control section 10 sets the document size acquired in step S201, that is, the document size of non-Z-folded document as the reference size of memory management. In a case where it was determined that the upmost document D1 is a Z-folded document in step S203, the control section 10 provides flag information (flag 1) indicating that the document is the Z-folded document to the header information of image data for the Z-folded document, and sets the management size of the image data for the Z-folded document to be twice the reference size.

For example, in a case where image reading is performed to the document bundle (reference size is A4) having a total of four documents in which the third document is a Z-folded document (A3), the control section 10 provides flag information to the third document which is the Z-folded document and sets the management size of the third document which is the Z-folded document to be twice the reference size.

Figures 8, 9:
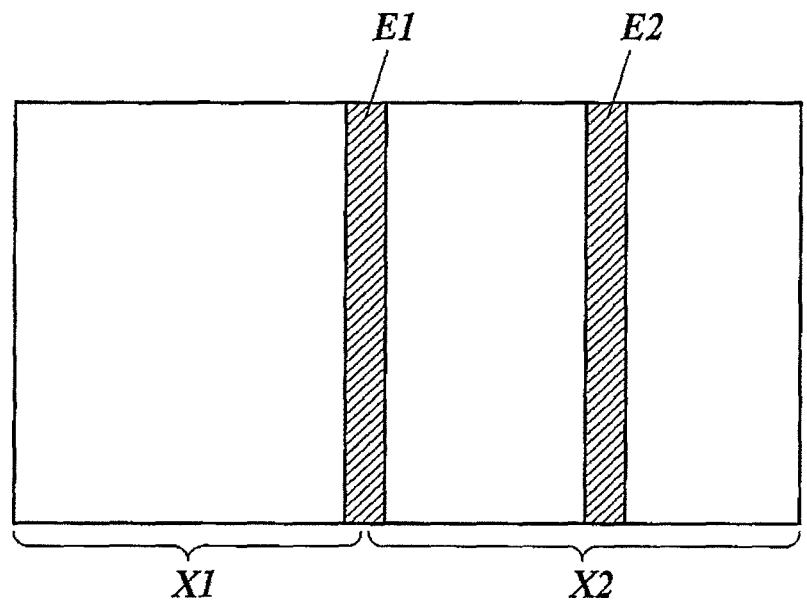
FIG. 8 is a view showing an example of memory management.
FIG. 9 is a view showing an example of an image correction region of the Z-folded document.

Specifically, as shown in FIG. 8, since the first document is a non-Z-folded document of A4 size, one page of reference size (A4 size) is assigned, and only the page information (P1) is set as the header information. Since the second document is a non-Z-folded document of A4 size, one page of A4 size is assigned, and only the page information (P2) is set as the header information. Since the third document is a Z-folded document of A3 size, two pages of A4 size are assigned. The page information (P3) and flag information (flag 1) are set as the header information to the first page of the two pages, and page information (P4) and flag information (flag 1) are set as the header information to the next page. Since the fourth document is a non-Z-folded document of A4 size, one page of A4 size is assigned and only the page information (P5) is set as the header information.

Accordingly, at the time of image editing processing and image output processing performed after the image reading, whether or not the data is image data of Z-folded document can be determined easily by determining whether or not the flag information exists with reference to the header information of each image data.

The control section 10 determines whether or not the next document exists, that is, whether or not a document is placed on the document tray T1 (step S207).

If it is determined that the next document exists (step S207: YES), the control section 10 proceeds to step S202 and starts conveyance of the next document.

On the other hand, if it is not determined that the next document exists (step S207: NO), the control section 10 ends the processing.

As described above, the image forming apparatus 1 according to the embodiment includes: a document size detector 108 which detects the document size of a document; a processor (control section 10) configured to detect whether or not a Z-fold exists in the document for which the document size was detected by the document size detector 108; unfold the Z-folded part of the Z-folded document for which Z-fold was detected; and assign image data of the image read by the image reading section (scanner section 30) to a page memory 20 on the basis of the document size detected by the document size detector 108 and whether or not a Z-fold was detected.

Accordingly, the image forming apparatus 1 according to the embodiment can manage the document page without generating wasted space in the page memory 20 nor changing the management size of image data. Thus, even in a case where image reading is performed to documents having Z-folded documents mixed therein, the decrease in productivity according to the reading can be suppressed while achieving efficient memory management.

In the image forming apparatus 1 according to the embodiment, the processor sets the management size of image data for a Z-folded document to be twice the management size of image data for a non-Z-folded document, and provides flag information indicating that the document is a Z-folded document to the header information of image data for the Z-folded document.

Accordingly, the image forming apparatus 1 according to the embodiment can easily determine whether or not the data is image data of Z-folded document by merely referring to the flag information. Thus, processing can be performed efficiently and accurately when image editing processing and image output processing are performed after the image reading.

In the image forming apparatus 1 according to the embodiment, the processor sets the document size detected by the document size detector 108 as a reference size.

Accordingly, the image forming apparatus 1 according to the embodiment sets the reference size to be the document size of non-Z-folded documents which exist generally more than Z-folded documents. Thus, memory management in the page memory 20 can be achieved easily and efficiently, and the decrease in productivity according to the reading can be surely suppressed.

Though the present invention has been described specifically on the basis of the embodiment, the present invention is not limited to the above embodiment and modifications can be made within the scope of the invention.

For example, image correction may be performed to image data for a Z-folded document which was read by the scanner section 30.

In the image data for a Z-folded document, the image is deteriorated due to the two folding lines generated by the Z-fold. The valley-folded line and the mountain-folded line of the Z-folded document pass the scanner section 30 in this order. Generally, the document surface is focused assuming that the document has no folding line. Thus, the focus position of the surface is deviated in the far point direction for the valley-folded line, and the focus position is deviated in the near point direction for the mountain-folded line, causing the decrease in image quality due to the focus deviations. Furthermore, the deterioration of image due to the folding lines (for example, deviation of ruled lines in a table and deviation of characters) is generated, making the lack of information noticeable. The deterioration of image quality due to the folding lines can be avoided by adopting a reading optical system which ensures sufficient depth of field by investing lens cost. However, recent low cost scanners do not have sufficient depth of field in some cases since the scanners adopt optical systems using CIS (Contact Image Sensor).

Even in a case of adopting the above scanner which does not have sufficient depth of field, the deterioration of image quality can be improved and images with high image quality can be read out by performing image correction.

As shown in FIG. 9, the image data of Z-folded document has folding lines respectively at the region E1 located from the rear end of the first page (first page X1) which was provided with the flag information to the front end of the next page (second page X2), and at the region E2 located in the middle of the next page. Accordingly, when an image of Z-folded document is read, the control section 10 refers to the page information and flag information and sets the above regions E1 and E2 as an image correction region to perform image correction. At this time, the control section 10 performs image correction according to the type of folding lines (mountain-fold and valley-fold) of the regions. The image correction may be performed on the basis of the folding type and folding position which are detected by operating the Z-folded document detection sensor 110.

The image correction may be performed by adopting known methods such as sharpness filter processing.

By the control section 10 performing image correction to the Z-folded document on the basis of the flag information as described above, the image deterioration due to the folding lines of Z-folded document can be improved and an image with high image quality can be read out, thus improving the image reading property.

Especially, by the control section 10 performing image correction according to the type of folding lines of Z-folded document, the correction can be performed accurately and excellent effect can be obtained in improving the image quality.

Though the document size detected by the document size detector 108 is set as a reference size in the embodiment, the present invention is not limited to this. For example, instead of setting the document size detected by the document size detector 108 as the reference size, the reference size may be set to the document size of non-Z-folded document which was detected on the basis of the detection information of the Z-folded document detection sensor 110.

In this case, since the reference size is set to be the document size of non-Z-folded documents which are included generally more than the Z-folded documents, the memory management in the page memory 20 can be achieved easily and efficiently, and the decrease in productivity according to the reading can be surely suppressed.

It is also possible to include both the configuration of setting the reference size to the document size which was detected by the document size detector 108 and the configuration of setting the reference size to the document size of non-Z-folded document which was detected on the basis of the detection information of the Z-folded document detection sensor 110.

Though flag information is provided to the header information of image data for a Z-folded document in the embodiment, the present invention is not limited to this. For example, instead of providing the flag information to the header information, there may be provided linkage information for linking the two pages assigned for a Z-folded document (first page X1 and second page X2) to each other.

Though an optical ranging sensor is described as an example of the Z-folded document detection sensor 110 in the embodiment, the present invention is not limited to this. For example, instead of the optical ranging sensor, there may be used physical contact type detection sensors and sensors which detect the variation in the height direction of document from the document surface.

As for the other detailed configurations and detailed operation of the sections forming the image forming apparatus, modifications can be made appropriately within the scope of the present invention.

According to one aspect of a preferred embodiment of the present invention, there is provided an image reading apparatus which includes an image reading section that reads an image on a document, and a document conveyance section that conveys a document placed on a document tray to the image reading section, the image reading apparatus including: a document size detector which detects a document size of the document; a processor configured to detect whether or not a Z-fold exists in the document for which the document size is detected by the document size detector; unfold a Z-folded part of a Z-folded document for which a Z-fold is detected; and assign image data of the image read by the image reading section to a page memory on the basis of the document size detected by the document size detector and whether or not a Z-fold is detected.

According to an image reading apparatus in the embodiment, even in a case where image reading is performed to the Z-fold mixed documents, the decrease in productivity according to reading can be suppressed while achieving efficient memory management.

The entire disclosure of Japanese Patent Application No. 2015-116211 filed on Jun. 9, 2015 including description, claims, drawings, and abstract are incorporated herein by reference in its entirety.

What is claimed is:

1. An image reading apparatus which includes an image reading section that reads an image on a document, and a document conveyance section that conveys a document placed on a document tray to the image reading section, the image reading apparatus comprising:
   a document size detector which detects a document size of the document; and
   a processor configured to
   detect whether or not a Z-fold exists in the document for which the document size is detected by the document size detector;
   unfold a Z-folded part of a Z-folded document for which a Z-fold is detected; and
   assign image data of the image read by the image reading section to a page memory on the basis of the document size detected by the document size detector and whether or not a Z-fold is detected.

2. The image reading apparatus of claim 1, wherein the processor sets a management size of image data for the Z-folded document to twice a management size of image data for a non-Z-folded document, and provides flag information indicating that the document is the Z-folded document to header information of the image data for the Z-folded document.

3. The image reading apparatus of claim 2, wherein the processor sets the document size detected by the document size detector as a reference size.

4. The image reading apparatus of claim 2, wherein the processor sets, as a reference size, a document size of the non-Z-folded document for which a Z-fold is not detected.

5. The image reading apparatus of claim 2, wherein the processor performs image correction to the Z-folded document on the basis of the flag information.

6. The image reading apparatus of claim 5, wherein the processor performs image correction corresponding to a type of a folding line of the Z-folded document.

7. An image forming apparatus comprising:
   the image reading apparatus of claim 1; and
   an image forming section which forms an image of a document on a sheet, the image of the document being read by the image reading section.

8. A non-transitory computer readable recording medium which stores a program that makes a computer execute a processing procedure, the processing procedure comprising:
   detecting whether or not a Z-fold exists in a document for which a document size is detected by a document size detector;

unfolding a Z-folded part of a Z-folded document for which a Z-fold is detected; and assigning image data of an image read by an image reading section to a page memory on the basis of the document size detected by the document size detector and whether or not a Z-fold is detected.

9. The recording medium of claim 8, wherein a management size of image data for the Z-folded document is set to twice a management size of image data for a non-Z-folded document, and flag information indicating that the document is the Z-folded document is provided to header information of the image data for the Z-folded document.

10. The recording medium of claim 9, wherein the document size detected by the document size detector is set as a reference size.

11. The recording medium of claim 9, wherein a document size of the non-Z-folded document for which a Z-fold is not detected is set as a reference size.

12. The recording medium of claim 9, wherein image correction is performed to the Z-folded document on the basis of the flag information.

13. The recording medium of claim 12, wherein image correction corresponding to a type of a folding line of the Z-folded document is performed.

\* \* \* \* \*